(12) United States Patent
Krishnan et al.

(10) Patent No.: US 9,880,774 B2
(45) Date of Patent: Jan. 30, 2018

(54) METHODS FOR AUTOMATIC DATA STORAGE DEVICE ASSIGNMENT DURING SYSTEM INITIALIZATION AND DEVICES THEREOF

(71) Applicant: NetApp, Inc., Sunnyvale, CA (US)

(72) Inventors: Sasidharan Krishnan, Fremont, CA (US); Kalaivani Arumugham, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 85 days.

(21) Appl. No.: 15/143,029

(22) Filed: Apr. 29, 2016

(65) Prior Publication Data

US 2017/0315750 A1 Nov. 2, 2017

(51) Int. Cl.
*G06F 3/06* (2006.01)
*H04L 29/08* (2006.01)

(52) U.S. Cl.
CPC .......... *G06F 3/0644* (2013.01); *G06F 3/0604* (2013.01); *G06F 3/067* (2013.01); *G06F 3/0688* (2013.01); *H04L 67/1097* (2013.01)

(58) Field of Classification Search
CPC .... G06F 3/0604; G06F 3/0605; G06F 3/0631; G06F 3/0634; G06F 3/0644; G06F 3/067; G06F 3/0688; G06F 12/0646; H04L 67/1097

USPC .................................................. 711/148, 170
See application file for complete search history.

(56) References Cited

U.S. PATENT DOCUMENTS

| 7,240,167 B2 * | 7/2007 | Shirogane | G06F 3/0619 711/148 |
| 2013/0067188 A1 * | 3/2013 | Mehra | G06F 3/0605 711/170 |

\* cited by examiner

*Primary Examiner* — Gary Portka
(74) *Attorney, Agent, or Firm* — LeClairRyan, a Professional Corporation

(57) ABSTRACT

A method, non-transitory computer readable medium and storage node computing device that reserves one of a plurality of data storage devices that is designated as a coordinator data storage device. A section of the storage cluster that is unowned is identified. Ownership of a subset of the data storage devices that is in the section of the storage cluster is obtained. A determination is made when the subset of the data storage devices includes the coordinator data storage device. The reservation of the coordinator data storage device is released, when the determining indicates that the subset of the data storage devices does not include the coordinator data storage device.

18 Claims, 5 Drawing Sheets

US 9,880,774 B2

METHODS FOR AUTOMATIC DATA STORAGE DEVICE ASSIGNMENT DURING SYSTEM INITIALIZATION AND DEVICES THEREOF

FIELD

This technology relates to data storage networks, and more particularly to methods and devices for automatically assigning data storage devices during storage node computing device initialization.

BACKGROUND

In many storage networks, storage node computing devices share a plurality of data storage devices in a cluster or array that may be hosted by a shelf or other enclosure. The storage node computing devices may be cooperating to provide high availability or other storage services for the storage network. As one particular example, the storage node computing devices may be a high availability (HA) pair of storage servers or filers that utilize an array of flash solid state drives (SSDs) hosted by a shelf in a Fibre-attached storage (FAS) architecture.

Currently, when storage node computing devices are initialized in a storage network, the data storage devices are not automatically assigned to the storage node computing devices in the network. Data storage devices are not automatically assigned to the storage node computing devices, at least in part, because there is currently no way to provide conflict resolution between storage node computing devices (e.g., when storage node computing devices are initialized at substantially the same time).

Accordingly, at least a portion of the data storage devices are assigned manually by administrators, which can be time-consuming, are prone to errors, and often results in an assignment that is not optimized for performance. Moreover, re-initialization of storage node computing devices also currently requires manual intervention, which is undesirable.

DETAILED DESCRIPTION

Figure 1:
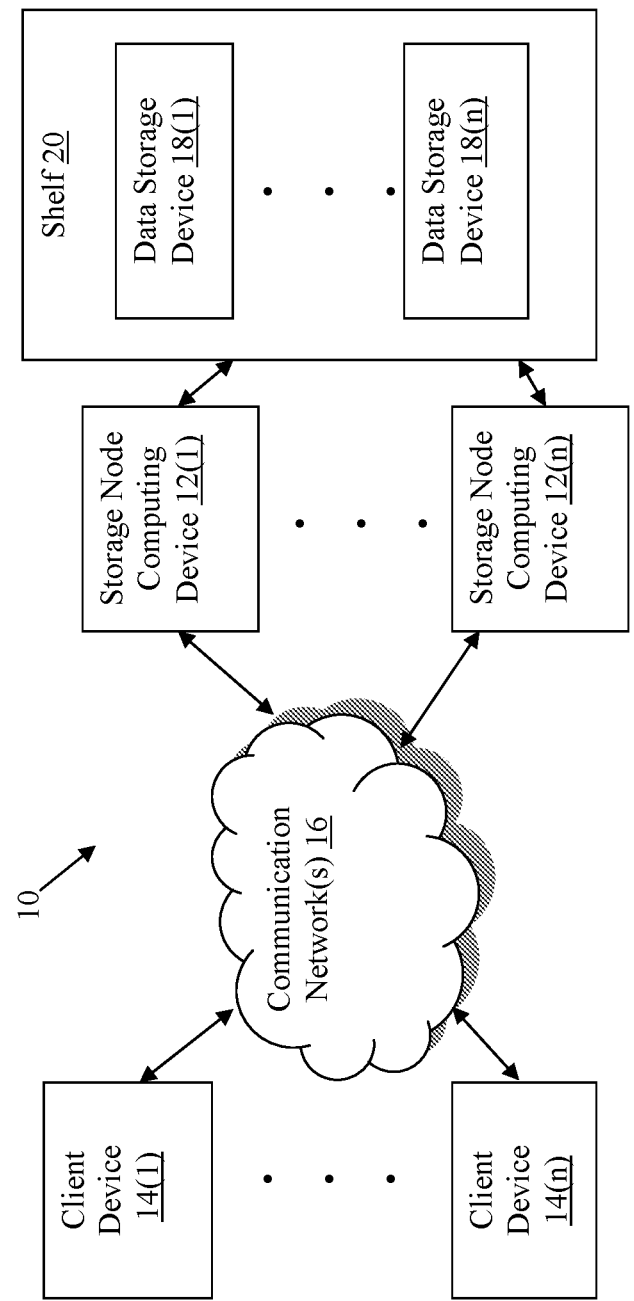
FIG. 1 is a block diagram of a network environment with a plurality of exemplary storage node computing devices coupled to a shelf hosting a plurality of data storage devices.

A network environment 10 including exemplary storage node computing devices 12(1)-12(n) is illustrated in FIG. 1. The storage node computing devices 12(1)-12(n) in this example are coupled to client devices 14(1)-14(n) via communication network(s) 16 and data storage devices 18(1)-18(n) hosted by a shelf 20 via another communication network, bridge, and/or switch (not shown), although this network environment 10 can include other numbers and types of systems, devices, components, and/or elements in other configurations. Additionally, the network environment 10 may include other network devices such as one or more routers and/or switches, for example, which are well known in the art and thus will not be described herein. This technology provides a number of advantages including methods, non-transitory computer readable media, and devices that automatically assign data storage devices during storage node computing device initialization, thereby reducing the time and resources required for, and the number of errors introduced during, the initialization.

Figure 2:
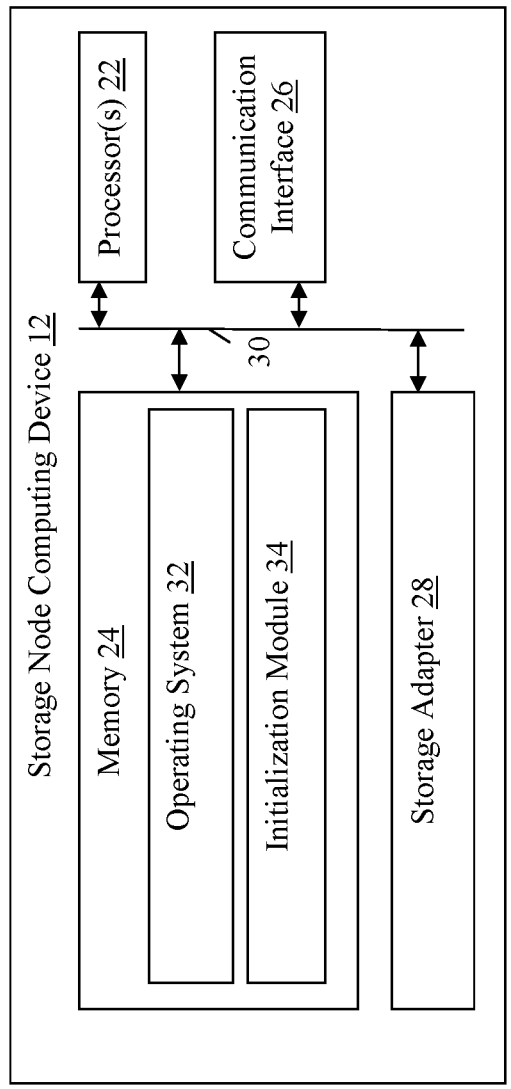
FIG. 2 is a block diagram of one of the exemplary storage node computing device shown in FIG. 1.

Referring to FIG. 2, a block diagram of one of the exemplary storage node computing devices 12(1)-12(n) is illustrated. The storage node computing device 12 generally provides file services relating to the organization of information on the data storage devices 18(1)-18(n) on behalf of the client devices 14(1)-14(n). In this example, the storage node computing device 12 includes processor(s) 22, a memory 24, a communication interface 26, and a storage adapter 28, which are coupled together by a bus 30 or other communication link.

The processor(s) 22 of the storage node computing device 12 may execute a program of stored instructions for one or more aspects of the this technology, as described and illustrated by way of the embodiments herein, although the processor(s) 22 could execute other numbers and types of programmed instructions. The processor(s) 22 in the storage node computing device 12 may include one or more central processing units (CPUs) or general purpose processors with one or more processing cores, for example.

The memory 24 of the storage node computing device 12 may include any of various forms of read only memory (ROM), random access memory (RAM), flash memory, non-volatile or volatile memory, or the like, or a combination of such devices, for example. In this example, the memory 24 includes an operating system 32 and an initialization module 34, although other types and/or numbers of applications or modules can also be included in other examples.

The operating system 32 is configured to functionally organize stored data by invoking storage operations to facilitate file services provided by the storage node computing device 12. In particular, the operating system 32 implements a file system to logically organize information as a hierarchical structure of directories and files on the data storage devices 18(1)-18(n). Accordingly, the operating system 34 cooperates with the storage adapter 28 to access information requested by the client devices 14(1)-14(n) and stored on the data storage devices 18(1)-18(n), among other functions.

The initialization module 34 is configured to manage the initialization of the storage node computing device 12 and, in particular, the automatic assignment of a portion of the data storage devices 18(1)-18(n) to the storage node computing device 12. The initialization module 34 is preconfigured (e.g., during manufacturing) to store an indication of which of the data storage devices 18(1)-18(n) is designated as a coordinator data storage device as well as, optionally, the arrangement of the storage node computing device 12 in the network environment 10 (e.g., as one storage node computing device of a high availability (HA) pair). The initialization module 34 is further configured to reserve the coordinator data storage device and obtain ownership of a plurality of the data storage devices 18(1)-18(n) for use by the storage node computing device 12, as described and illustrated in more detail later.

The communication interface 26 of the storage node computing device 12 can include one or more network interface controllers (NICs) for operatively coupling and communicating between the storage node computing device 12 and the client devices 14(1)-14(n), which are coupled together by the communication network(s) 16, although other types and numbers of communication networks or systems with other types and numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The storage adapter 28 can cooperate with the operating system 32 to access information requested by the client devices 14(1)-14(n). The information may be stored on the data storage devices 18(1)-18(n) in logical volumes, for example. The storage adapter 28 includes input/output (I/O) or communication interface circuitry that couples to the data storage devices 18(1)-18(n) over an I/O interconnect arrangement such as a conventional high-performance, Fibre Channel serial link topology, SAS, SCSI, or SATA, for example. The storage adapter 28 can communicate with the data storage devices 18(1)-18(n) over a network, bridge, and/or switch (not shown).

Referring back to FIG. 1, each of the client devices 14(1)-14(n) in this example includes a processor, a memory, a communication interface, and optionally an input device and a display device, which are coupled together by a bus or other link, although each of the client devices 14(1)-14(n) can have other types and numbers of components or other elements and other numbers and types of network devices could be used. The client devices 14(1)-14(n) may run interface applications that provide an interface to make requests for and send content and/or data to the storage node computing device 12 via the communication network(s) 16, for example. Each of the client devices 14(1)-14(n) may be a conventional personal computer, a tablet computing device, a smart phone, a virtual machine running in a cloud, an application server hosting applications that utilize back-end storage, or other processing and/or computing device, for example.

The data storage devices 18(1)-18(n) collectively comprise a storage cluster and can be hard disk drives, solid state drives (SSDs), flash drives, optical disk-based storage, any combination thereof, or any other type of stable, non-volatile storage suitable for storing files or objects in storage volumes for short or long term retention, for example. The data storage devices 18(1)-18(n) optionally host one or more volumes based on a Redundant Array of Inexpensive Disks (RAID) architecture or other topology facilitating data persistency, although other types and numbers of volumes in other topologies can also be used.

In this particular example, the data storage devices 18(1)-18(n) are solid state drives comprising flash memory and collectively comprise an all flash array. In this example, the data storage devices 18(1)-18(n) are located at slots in the shelf 20. While the shelf 20 is illustrated in FIG. 1 as being separate from the storage node computing device 12(1)-12(n), the data storage devices 18(1)-18(n) can also be hosted by a same enclosure, rack, or cabinet as one or more of the storage node computing devices 12(1)-12(n), for example, and the data storage devices 18(1)-18(n) can also be located elsewhere in the network environment 10.

Although examples of the storage node computing devices 12(1)-12(n), client devices 14(1)-14(n), and data storage devices 18(1)-18(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
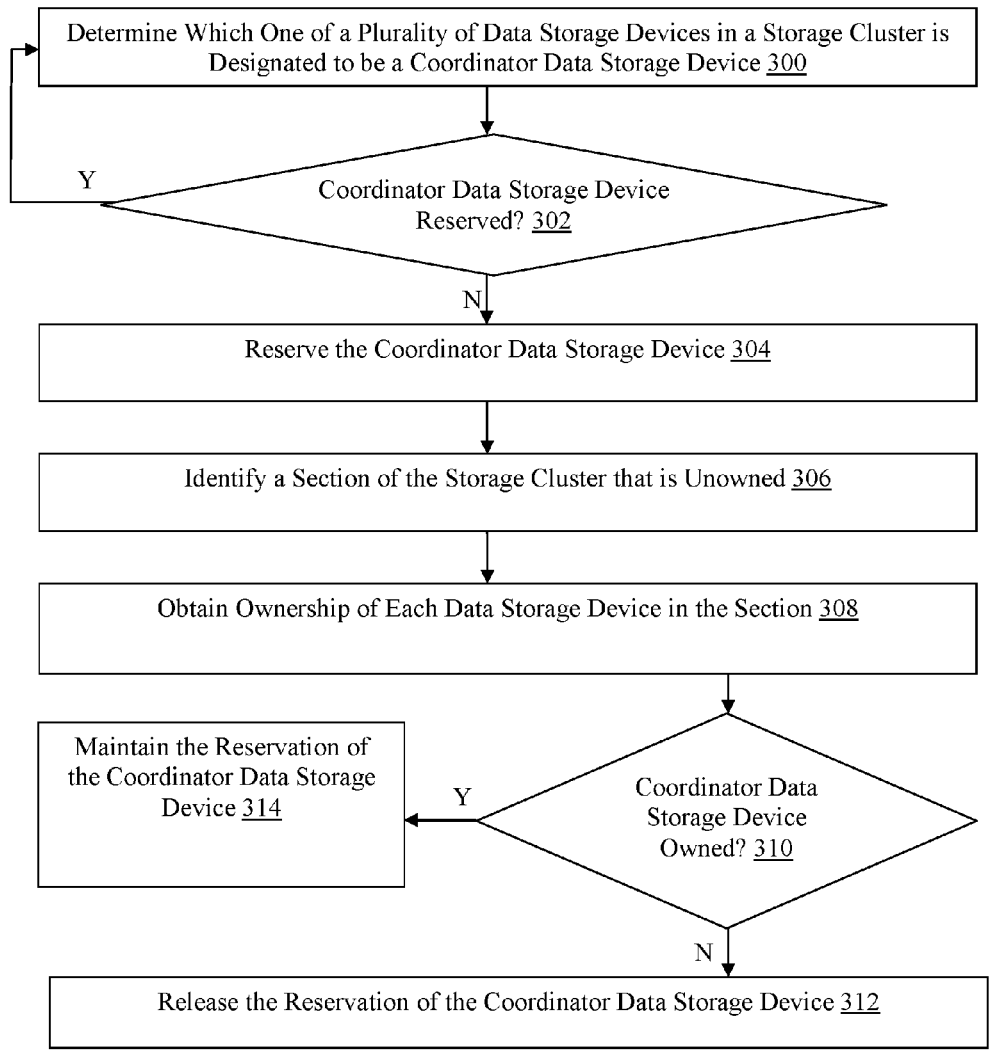
FIG. 3 is a flowchart of an exemplary method for automatically assigning data storage devices during storage node computing device initialization.

An exemplary method for automatically assigning data storage devices during storage node computing device initialization will now be described with reference to FIGS. 1-5. Referring more specifically to FIG. 3, in step 300, one of the storage node computing devices 12(1)-12(n) determines which one of the data storage devices 18(1)-18(n) in the storage cluster is designated to be a coordinator data storage device. In this example, the one of the storage node computing devices 12(1)-12(n) is preconfigured (e.g., during manufacturing) such that one of the data storage devices 18(1)-18(n) in the shelf is determined to be the coordinator one of the data storage devices 18(1)-18(n).

In one particular example, the one of the storage node computing devices 12(1)-12(n), as well as each of the other of the storage node computing devices 12(1)-12(n), is preconfigured such that a last one of the data storage devices 18(1)-18(n) based on associated slot in the shelf 20 is the coordinator data storage device, although the first one of the data storage devices 18(1)-18(n) and any other of the data storage devices 18(1)-18(n) can also be used. The determination in step 300 can be made upon deployment of the one of the storage node computing devices 18(1)-18(n) in the network environment 10 or upon re-initialization, for example.

Figure 4:
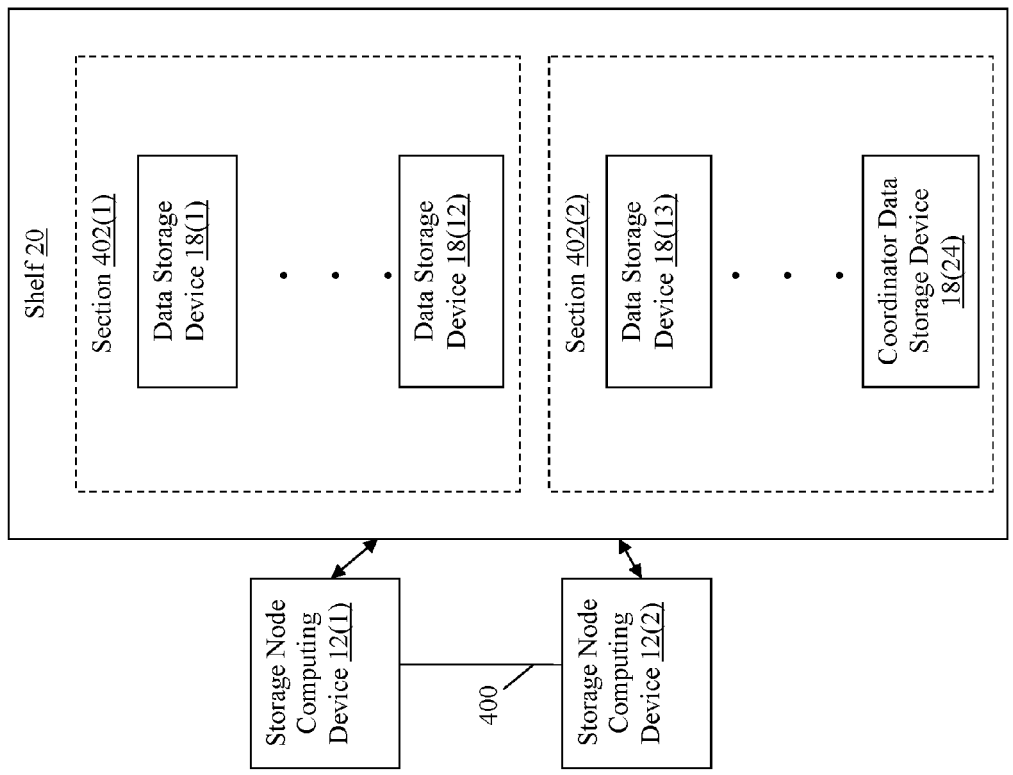
FIG. 4 is a block diagram of two exemplary storage node computing devices operating as a high availability (HA) pair coupled to a shelf hosting twenty four data storage devices.

Referring to FIG. 4, two exemplary storage node computing devices 12(1) and 12(2) operating as an HA pair coupled to a shelf 20 hosting data storage devices 18(1)-18(24) are illustrated. The storage node computing devices 12(1) and 12(2) are coupled together via an HA interconnect 400 in this example, which facilitates the transfer of information between the storage node computing devices 12(1) and 12(2) (e.g., mirrored storage operations that can be replayed in the event of a failure of one of the storage node computing devices 12(1) or 12(2)). In this example, the last data storage device 18(24) is designated, based on a default or stored configuration, to be a coordinator data storage device.

Referring back to FIG. 3, in step 302, the one of the storage node computing devices 12(1)-12(n) determines whether the coordinator one of the data storage devices 18(1)-18(n) is currently reserved by another one of the storage node computing devices 12(1)-12(n). The one of the storage node computing devices 12(1)-12(n) can determine whether the coordinator one of the data storage devices 18(1)-18(n) is currently reserved using an interface provided by a driver (e.g., a SCSI driver) of the coordinator one of the data storage devices 18(1)-18(n), for example, although other methods of determining whether the coordinator one of the data storage devices 18(1)-18(n) is currently reserved can also be used.

Accordingly, if the one of the storage node computing devices 12(1)-12(n) determines that the coordinator one of the data storage devices 18(1)-18(n) is currently reserved by another of the storage node computing devices 12(1)-12(n), then the Yes branch is taken back to step 300 and the one of the storage node computing devices 12(1)-12(n) effectively waits for the reservation of the coordinator one of the data storage devices 18(1)-18(n) to be released.

However, if the one of the storage node computing devices 12(1)-12(n) determines that the coordinator one of the data storage devices 18(1)-18(n) is not currently reserved, then the No branch is taken to step 304. In step 304, the one of the data storage computing devices 12(1)-12(n) reserves the coordinator one of the data storage devices 18(1)-18(n). In this example, the one of the storage node computing devices 12(1)-12(n) reserves the coordinator one of the data storage devices 18(1)-18(n) by obtaining a persistent group reservation (PGR) using the interface provided by a driver of the coordinator one of the data storage devices 18(1)-18(n).

Optionally, the one of the storage node computing devices 12(1)-12(n) can be preconfigured to push or store assignment logic to, or obtain assignment logic from, the coordinator one of the data storage devices 18(1)-18(n). In this example, the one of the storage node computing devices 12(1)-12(n) can be configured (e.g., during manufacturing) with assignment logic, which can include a pattern and can be based on a predefined number of storage node computing devices that will be sharing the storage cluster. The one of the storage node computing devices 12(1)-12(n) can be configured to obtain assignment logic if it is already stored on the coordinator one of the data storage devices 18(1)-18(n) or store assignment logic if it is not already stored on the coordinator one of the data storage devices 18(1)-18(n) for later retrieval by other of the storage node computing devices 12(1)-12(n) that may not have been preconfigured with the assignment logic.

For example, the assignment logic can include an indication that four storage node computing devices will be sharing the storage cluster, as well as a pattern that can be used in assigning or obtaining ownership of sections of the storage cluster or subsets of the data storage devices 18(1)-18(n), as described and illustrated in more detail later. Other types of assignment logic can also be stored on or retrieved from the one of the data storage devices 18(1)-18(n) determined to be the coordinator data storage device and other methods of reserving the one of the data storage devices 18(1)-18(n) can also be used. Accordingly, referring back to FIG. 4, the storage node computing device 12(1) can obtain a reservation on the coordinator data storage device 18(24).

Referring back to FIG. 3, in step 306, the one of the storage node computing devices 12(1)-12(n) identifies a section of the storage cluster that is unowned. In this example, the one of the data storage devices 18(1)-18(n) is configured to sequentially identify whether one or more of the data storage devices 18(1)-18(n) is owned beginning with a first one of the data storage devices 18(1)-18(n) located at a first slot in the shelf 20. Ownership can be determined by using an interface provided by a driver of the data storage devices 18(1)-18(n), or by determining whether metadata is stored in an predefined location on the data storage devices 18(1)-18(n), for example, and other methods of determining whether one or more of the data storage devices 18(1)-18(n) is currently owned can also be used.

Since the storage node computing devices 12(1)-12(n) are configured to obtain ownership of the data storage devices 18(1)-18(n) in sequential order in this particular example, if the one of the storage node computing devices 12(1)-12(n) is the first of the storage node computing devices 12(1)-12(n) to reserve the coordinator one of the data storage devices 18(1)-18(n), then the first one of the data storage devices 18(1)-18(n) located at the first slot in the shelf 20 will be unowned. However, if the one of the storage node computing devices 18(1)-18(n) is not the first of the storage node computing devices 12(1)-12(n) to reserve the coordinator one of the data storage devices 18(1)-18(n), then the first one of the data storage devices 18(1)-18(n) located at the first slot in the shelf 20 will be owned.

In this example, the one of the storage node computing devices 12(1)-12(n) can then proceed to determine ownership of the second and subsequent ones of the data storage devices 18(1)-18(n) until one of the data storage devices 18(1)-18(n) is encountered that is unowned. The encountered one of the data storage devices 18(1)-18(n) that is unowned will be in a different section of the storage cluster than the first one of the data storage devices 18(1)-18(n) since another of the storage node computing device 12(1)-12(n) will have previously obtained ownership of a subset of the data storage devices 18(1)-18(n) in the same section as the first one of the data storage devices 18(1)-18(n), as described and illustrated in more detail later.

Alternatively, the one of the storage node computing devices 12(1)-18(n) can determine ownership of only a candidate one of the data storage devices 18(1)-18(n) in a section of the storage cluster before proceeding to determine ownership of another candidate one of the data storage devices 18(1)-18(n) in another section of the storage cluster (e.g., in network environments with more than two storage node computing devices), or directly identifying an unowned section without determining ownership of another candidate one of the data storage devices 18(1)-18(n) in another section of the storage cluster (e.g., in network environments with two storage node computing devices).

In these examples, the storage node computing devices 12(1)-12(n) are preconfigured with the total number of storage node computing devices in the network and the total number of data storage devices 18(1)-18(n) in the storage cluster. Additionally, the storage node computing devices 12(1)-12(n) are preconfigured (or configured based on obtained assignment logic) to obtain ownership of an equal number of the data storage devices 18(1)-18(n). Accordingly, the assignment process can be deterministic in some environment, which allows the one of the storage node computing devices 12(1)-12(n) to use only a candidate one of the data storage devices 18(1)-18(n) in one or more sections of the storage cluster to identify a section of the storage cluster that is unowned.

In one particular example, and referring back to FIG. 4, if the storage node computing device 12(1), after reserving, in step 304, the coordinator data storage device 18(24), determines that the data storage device 18(1), as a candidate data storage device, is already owned, then the storage node computing device 12(1) can identify, in step 306, section 402(2) without determining the ownership of any of the data storage devices 18(13)-18(24) in section 402(2). In this particular example, the storage node computing device 12(1) is preconfigured to be part of an HA pair and, since there are only two storage node computing devices 12(1)-12(2) sharing the storage cluster, and data storage device 18(1) in section 402(1) is already owned, section 402(2) must be unowned and is therefore identified, in step 306, by the storage node computing device 12(1).

Referring back to FIG. 3, in step 308, the one of the storage node computing devices 12(1)-12(n) obtains ownership of a subset of the data storage devices 18(1)-18(n) in the section of the storage cluster identified in step 306. The one of the storage node computing devices 12(1)-12(n) obtains ownership of the subset of the data storage devices 18(1)-18(n) using an interface provided by a driver of each of the subset of the data storage devices 18(1)-18(n) or by writing metadata to a predefined location on each of the subset of the data storage devices 18(1)-18(n), for example, although ownership of the subset of the data storage devices 18(1)-18(n) in the identified section can also be obtained in other ways.

In one example, the one of the storage node computing devices 12(1)-12(n) is preconfigured to know the number of other storage node computing devices 12(1)-12(n) sharing the storage cluster and the size of the storage cluster (e.g., number of data storage devices 18(1)-18(n)). Additionally, the one of the storage node computing devices 12(1)-12(n) is preconfigured to obtain ownership of an equal-sized subset of the data storage devices 18(1)-18(n), which can be determined from the number of other storage node computing devices 12(1)-12(n) sharing the storage cluster and the size of the storage cluster. Accordingly, in the example described and illustrated earlier with reference to FIG. 4, the storage node computing device 12(1) can determine that the section 402(2) that is unowned includes data storage devices 18(13)-18(24), for which ownership is obtained in step 308.

The one of the storage node computing devices 12(1)-12(n) obtains ownership of a subset of the data storage devices 12(1)-12(n) in a section of the storage cluster in a continuous fashion, by default, or based on the pattern in the assignment logic optionally obtained in step 304. Referring again to FIG. 4, if the storage node computing device 12(1) identifies section 402(2) in step 306, then the storage node computing device 12(1) obtains ownership of data storage devices 18(13)-18(24) in step 308 in examples in which ownership of the subset of the data storage devices 18(1)-18(n) is obtained in a continuous fashion. However, in another example, the storage node computing device 12(1) can obtain assignment logic in step 304 that identifies a pattern of "ABAB" reflecting alternating ownership of the data storage devices 18(1)-18(24), wherein the sections each span multiple separated subsets of the data storage devices 18(1)-18(24).

Figure 5:
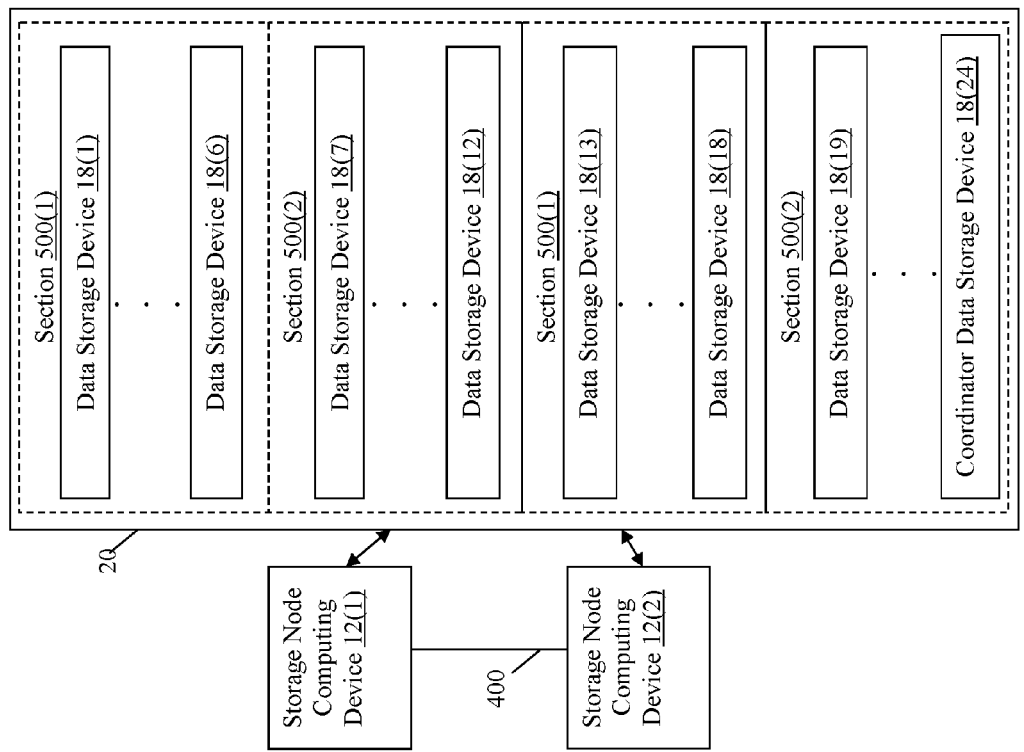
FIG. 5 is a block diagram of two exemplary storage node computing devices operating as a high availability (HA) pair coupled to a shelf hosting twenty four data storage devices arranged in sections according to an alternating pattern.

Referring more specifically to FIG. 5, a block diagram of the exemplary storage node computing devices 12(1) and 12(2) of FIG. 4 operating as an HA pair coupled to the shelf 20 hosting data storage devices 18(1)-18(24) arranged in sections 500(1) and 500(2) according to an alternating pattern is illustrated. In this example, the storage node computing device 12(1), which identified section 500(2) in step 306, obtains ownership of data storage devices 18(7)- 18(12) and 18(19)-18(24) in step 308 using the assignment logic. Other numbers of storage node computing devices or data storage devices can be used in other examples, and other types and number of patterns can also be included in the assignment logic stored or obtained in step 304.

Referring back to FIG. 3, in step 310, the one of the storage node computing devices 12(1)-12(n) determines whether it owns the coordinator one of the data storage devices 18(1)-18(n). Since ownership of the data storage devices 18(1)-18(n) is obtained in sequential order in this example, the one of the storage node computing devices 12(1)-12(n) is the last of the storage node computing devices 12(1)-12(n) to obtain ownership of a subset of the data storage devices 18(1)-18(n) if it owns the coordinator one of the data storage devices 18(1)-18(n).

However, in this example, the one of the storage node computing devices 12(1)-12(n) is not the last of the storage node computing devices 12(1)-12(n) to obtain ownership of a subset of the data storage devices 18(1)-18(n) if it does not own the coordinator one of the data storage devices 18(1)- 18(n). Accordingly, if the one of the storage node computing devices 12(1)-12(n) determines in step 310 that it does not own the coordinator one of the data storage devices 18(1)- 18(n), then the No branch is taken to step 312.

In step 312, the one of the storage node computing devices 12(1)-12(n) releases the reservation of the coordinator one of the data storage devices 18(1)-18(n), such as by using an interface provided by a driver of the coordinator one of the data storage devices 18(1)-18(n), for example. Other methods of releasing the reservation of the coordinator one of the data storage devices 18(1)-18(n) can also be used in other examples. In the examples described and illustrated herein with reference to FIGS. 4 and 5, the storage node computing device 12(2) would determine that it did not obtain ownership of the coordinator storage node computing device 18(24). Therefore, the No branch would be taken from step 310 and the reservation of the coordinator data storage device 18(12) would be released in step 312.

By releasing the reservation of the coordinator one of the data storage devices 18(1)-18(n), another one of the storage node computing devices 12(1)-12(n) can then proceed to reserve the coordinator one of the data storage devices 18(1)-18(n), as described and illustrated earlier with reference to step 304, and subsequently obtain ownership of a subset of the data storage devices 18(1)-18(n) included in another section of the storage cluster. Accordingly, by allowing only ones of the storage node computing devices 12(1)- 12(n) that have reserved the coordinator one of the data storage devices 18(1)-18(n) to obtain ownership of a subset of the data storage devices 18(1)-18(n) at any one time, this technology advantageously resolves conflict or contention issues between storage node computing devices 12(1)-12(n) automatically and without manual intervention or manual assignment of the data storage node computing devices 18(1)-18(n).

In another example, the one of the storage node computing devices 12(1)-12(n) can optionally release the reservation of the coordinator one of the data storage devices 18(1)-18(n) subsequent to obtaining ownership, in step 308, of a first one of the subset of the data storage devices 18(1)-18(n) in the section identified in step 306. In these examples, a second one of the storage node computing devices 12(1)-12(n) that subsequently reserved the coordinator one of the data storage devices 18(1)-18(n), if any, would first determine whether the first one of the data storage devices 18(1)-18(n) in the section previously identified by the one of the storage node computing devices 12(1)-12(n) in step 306 was already owned.

Since the one of the storage node computing devices 12(1)-12(n) necessarily obtained ownership of the first one of the data storage devices 18(1)-18(n) in the section identified in step 306 in this example, irrespective of whether the one of the storage node computing devices 12(1)-12(n) obtained ownership of any other of the data storage devices 18(1)-18(n) in the section identified in step 306, the second one of the storage node computing devices 12(1)-12(n) could assume the remainder of the section was owned by the one of the storage node computing devices 12(1)-12(n) and continue the process of identifying an unowned section. In these examples, the storage node computing devices 12(1)-12(n) are configured to determine ownership of the data storage devices 18(1)-18(n) sequentially based on associated slot in the shelf 20, or to use the first one of the data storage devices 18(1)-18(n) in a section as a candidate data storage device, as described and illustrated earlier with reference to step 306 of FIG. 3.

Referring to FIG. 4, the storage node computing device 12(2), which identified, in step 306, section 402(1) in this example can optionally release the reservation of the coordinator data storage device 18(24) once ownership is obtained, in step 308, of the data storage device 18(1), even if it has not yet obtained ownership of one or more of the data storage devices 18(2)-18(12). When the storage node computing device 12(1) determines, in step 302, that the coordinator data storage device 18(24) is no longer reserved, it will reserve, in step 304, the coordinator data storage device 18(24).

In step 306, the storage node computing device 12(1) will then determine whether section 402(1) is owned based on whether the data storage device 18(1) is owned (e.g., as a candidate data storage device in the section 402(1)). Since the storage node computing device 12(2) already obtained ownership of the data storage device 18(1), the storage node computing device 12(1) will proceed to identify, in step 306, the section 402(2).

Similarly, and referring to FIG. 5, the storage node computing device 12(2), which identified, in step 306, section 500(1) in this example can optionally release the reservation of the coordinator data storage device 18(24) once ownership is obtained, in step 308, of the data storage device 18(1), even if it has not yet obtained ownership of one or more of data storage devices 18(2)-18(6) or 18(13)-18(18). When the storage node computing device 12(1) determines, in step 302, that the coordinator data storage device 18(24) is no longer reserved, it will reserve, in step 304, the coordinator data storage device 18(24).

In step 306, the storage node computing device 12(1) will then determine whether the section 500(1) is owned based on whether the data storage device 18(1) is owned (e.g., as a candidate data storage device in the section 500(1)). Since the storage node computing device 12(2) already obtained ownership of the data storage device 18(1), the storage node computing device 12(1) will proceed to identify, in step 306, the section 500(2). Accordingly, in these examples, ownership of data storage devices can advantageously be obtained concurrently by multiple storage node computing devices.

Referring back to FIG. 3, if the one of the storage node computing devices 12(1)-12(n) determines in step 310 that it does own the coordinator one of the data storage devices 18(1)-18(n), then the Yes branch is taken to step 314. In step 314, the one of the storage node computing devices 12(1)-12(n) optionally maintains the reservation of the coordinator one of the data storage devices 18(1)-18(n), although the reservation can also be released since all of the storage node computing devices 12(1)-12(n) will necessarily have completed the assignment process and obtained ownership of respective subsets of the data storage devices 18(1)-18(n) in all of the subsets of the storage cluster.

With this technology, data storage devices, such as flash SSDs, can be assigned by storage node computing devices automatically when the storage node computing devices are deployed or re-initialized. This technology automatically facilitates conflict resolution using a reservation of one of the data storage devices designated to be a coordinator data storage device. Accordingly, data storage devices can advantageously be assigned, with this technology, in a manner designed to optimize performance, without manual intervention, using fewer resources, and by introducing fewer errors.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    reserving, by a computing device, one of a plurality of data storage devices in a storage cluster that is designated as a coordinator data storage device;
    identifying, by the computing device, a subset of the storage cluster that is unowned;
    obtaining, by the computing device and subsequent to the reservation of the one of the data storage devices, ownership of the subset of the storage cluster, wherein the subset of the storage cluster comprises two or more of the data storage devices;
    determining, by the computing device, when the subset of the storage cluster includes the coordinator data storage device; and
    releasing, by the computing device, the reservation of the coordinator data storage device, when the determining indicates that the subset of the storage cluster does not include the coordinator data storage device.

2. The method of claim 1, further comprising:
    obtaining, by the computing device, ownership of the two or more of the data storage devices in a sequential order; and
    releasing, by the computing device, the reservation of the coordinator data storage device subsequent to obtaining ownership of a first one of the two or more of the data storage devices.

3. The method of claim 1, further comprising maintaining, by the computing device, the reservation of the coordinator data storage device, when the determining indicates that the subset of the storage cluster includes the coordinator data storage device.

4. The method of claim 1, further comprising:
    determining, by the computing device, assignment logic comprising at least a pattern; and
    obtaining, by the computing device, ownership of another one or more subsets of the storage cluster according to the pattern.

5. The method of claim 1, further comprising:
- writing, by the computing device, metadata to each of the two or more of the data storage devices in order to obtain ownership of the subset of the storage cluster; and
- obtaining, by the computing device, a persistent group reservation using another interface provided by another driver of the coordinator data storage device in order to reserve the coordinator data storage device.

6. The method of claim 1, wherein the data storage devices comprise solid state drives comprising flash memory.

7. A non-transitory machine readable medium having stored thereon instructions for automatic data storage device assignment during system initialization comprising machine executable code which when executed by at least one machine causes the machine to:
- reserve one of a plurality of data storage devices in a storage cluster that is designated as a coordinator data storage device;
- identify a subset of the storage cluster that is unowned;
- obtain, subsequent to the reservation of the one of the data storage devices, ownership of the subset of the storage cluster, wherein the subset of the storage cluster comprises two or more of the data storage devices;
- determine when the subset of the storage cluster includes the coordinator data storage device; and
- release the reservation of the coordinator data storage device, when the determining indicates that the subset of the storage cluster does not include the coordinator data storage device.

8. The non-transitory machine readable medium of claim 7, wherein the machine executable code when executed by the machine further causes the machine to:
- obtain ownership of the two or more of the data storage devices in a sequential order; and
- release the reservation of the coordinator data storage device subsequent to obtaining ownership of a first one of the two or more of the data storage devices.

9. The non-transitory machine readable medium of claim 7, wherein the machine executable code when executed by the machine further causes the machine to maintain the reservation of the coordinator data storage device, when the determining indicates that the subset of the storage cluster includes the coordinator data storage device.

10. The non-transitory machine readable medium of claim 7, wherein the machine executable code when executed by the machine further causes the machine to:
- determine assignment logic comprising at least a pattern; and
- obtain ownership of another one or more subsets of the storage cluster according to the pattern.

11. The non-transitory machine readable medium of claim 7, wherein the machine executable code when executed by the machine further causes the machine to:
- write metadata to each of the two or more of the data storage devices in order to obtain ownership of the subset of the storage cluster; and
- obtain a persistent group reservation using another interface provided by another driver of the coordinator data storage device in order to reserve the coordinator data storage device.

12. The non-transitory machine readable medium of claim 7, wherein the data storage devices comprise solid state drives comprising flash memory.

13. A computing device, comprising:
- a memory containing machine readable medium comprising machine executable code having stored thereon instructions for automatic data storage device assignment during system initialization; and
- a processor coupled to the memory, the processor configured to execute the machine executable code to cause the processor to:
  - reserve one of a plurality of data storage devices in a storage cluster that is designated as a coordinator data storage device;
  - identify a subset of the storage cluster that is unowned;
  - obtain, subsequent to the reservation of the one of the data storage devices, ownership of the subset of the storage cluster, wherein the subset of the storage cluster comprises two or more of the data storage devices;
  - determine when the subset of the storage cluster includes the coordinator data storage device; and
  - release the reservation of the coordinator data storage device, when the determining indicates that the subset of the storage cluster does not include the coordinator data storage device.

14. The computing device of claim 13, wherein the processor is further configured to execute the machine executable code to further cause the processor to:
- obtain ownership of the two or more of the data storage devices in a sequential order; and
- release the reservation of the coordinator data storage device subsequent to obtaining ownership of a first one of the two or more of the data storage devices.

15. The computing device of claim 13, wherein the processor is further configured to execute the machine executable code to further cause the processor to maintain the reservation of the coordinator data storage device, when the determining indicates that the subset of the storage cluster includes the coordinator data storage device.

16. The computing device of claim 13, wherein the processor is further configured to execute the machine executable code to further cause the processor to:
- determine assignment logic comprising at least a pattern; and
- obtain ownership of another one or more subsets of the storage cluster according to the pattern.

17. The computing device of claim 13, wherein the processor is further configured to execute the machine executable code to further cause the processor to:
- write metadata to each of the two or more of the data storage devices in order to obtain ownership of the subset of the storage cluster; and
- obtain a persistent group reservation using another interface provided by another driver of the coordinator data storage device in order to reserve the coordinator data storage device.

18. The computing device of claim 13, wherein the data storage devices comprise solid state drives comprising flash memory.

* * * * *